United States Patent
Clark et al.

(10) Patent No.: US 10,153,558 B2
(45) Date of Patent: Dec. 11, 2018

(54) SIGNAL TRANSMITTING COMPONENT

(71) Applicant: ROLLS-ROYCE plc, London (GB)

(72) Inventors: Daniel Clark, Belper (GB); Werner P. Schiffers, Ashby-de-la-Zouch (GB)

(73) Assignee: ROLLS-ROYCE PLC, London (GB)

( * ) Notice: Subject to any disclaimer, the term of this patent is extended or adjusted under 35 U.S.C. 154(b) by 33 days.

(21) Appl. No.: 15/477,655

(22) Filed: Apr. 3, 2017

(65) Prior Publication Data
US 2017/0324168 A1    Nov. 9, 2017

(30) Foreign Application Priority Data
May 3, 2016  (GB) .................................. 1607672.1

(51) Int. Cl.
| | |
|---|---|
| *H01Q 1/28* | (2006.01) |
| *H01Q 13/24* | (2006.01) |
| *H01P 3/16* | (2006.01) |
| *H04B 3/52* | (2006.01) |
| *H04B 1/40* | (2015.01) |
| *F01D 25/00* | (2006.01) |
| *F01D 25/24* | (2006.01) |
| *F04D 29/52* | (2006.01) |
| *H01Q 1/32* | (2006.01) |
| *H01Q 1/34* | (2006.01) |

(52) U.S. Cl.
CPC .............. *H01Q 13/24* (2013.01); *H01P 3/16* (2013.01); *H04B 1/40* (2013.01); *H04B 3/52* (2013.01); *F01D 25/005* (2013.01); *F01D 25/24* (2013.01); *F04D 29/522* (2013.01); *F05D 2300/6111* (2013.01); *H01Q 1/287* (2013.01); *H01Q 1/3225* (2013.01); *H01Q 1/34* (2013.01)

(58) Field of Classification Search
CPC . H01Q 13/24; H04B 1/40; H04B 3/52; H01Q 1/3225; H01Q 1/34; H01Q 1/287
USPC .......................................................... 343/705
See application file for complete search history.

(56) References Cited

U.S. PATENT DOCUMENTS

| | | | |
|---|---|---|---|
| 6,828,876 B1 * | 12/2004 | Brooks ..................... | H01P 9/02 333/140 |
| 7,307,589 B1 | 12/2007 | Gregoire et al. | |
| 9,947,748 B2 * | 4/2018 | Bu ....................... | H01L 29/6681 |

(Continued)

FOREIGN PATENT DOCUMENTS

| | | |
|---|---|---|
| EP | 2 279 852 A1 | 2/2011 |
| EP | 2677669 A1 | 12/2013 |

(Continued)

OTHER PUBLICATIONS

Sep. 28, 2017 Search Report issued in European Patent Application No. EP 17 16 4519.

(Continued)

*Primary Examiner* — Brian Young
(74) *Attorney, Agent, or Firm* — Oliff PLC

(57) ABSTRACT

A component including a substrate with dielectric coating on the substrate. The electrical reactance of the dielectric coating configured for the propagation of electromagnetic surface waves. The dielectric coating is arranged as a plurality of discrete pathways. Also a signal transmission system including a component, an electromagnetic surface wave transmitter coupled to the substrate, and an electromagnetic surface wave receiver also coupled to the substrate.

18 Claims, 3 Drawing Sheets

(56) References Cited

U.S. PATENT DOCUMENTS

Figure 1:
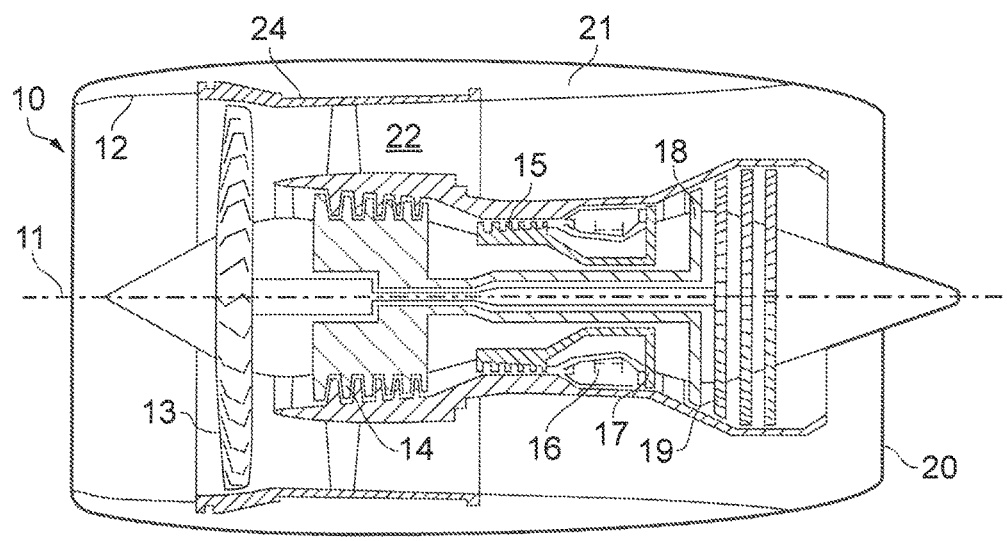

| | | | |
|---|---|---|---|
| 9,972,690 B2* | 5/2018 | Trautmann | H01L 29/407 |
| 9,986,637 B2* | 5/2018 | Chamberlin | H05K 1/0366 |
| 2008/0064331 A1 | 3/2008 | Washiro | |
| 2013/0064311 A1 | 3/2013 | Turner et al. | |
| 2014/0197848 A1 | 7/2014 | Gregoire et al. | |

FOREIGN PATENT DOCUMENTS

| | | |
|---|---|---|
| EP | 2 790 038 A2 | 10/2014 |
| EP | 2 799 477 A2 | 11/2014 |
| EP | 2 822 089 A1 | 1/2015 |
| GB | 2494435 A | 3/2013 |
| GB | 2522344 A | 7/2015 |

OTHER PUBLICATIONS

Turner, Janice et al. "How Surface Waves Reduce Through-Life Costs" vol. 46, No. 6, pp. 180-184, Jul. 2013.

Hendry, Janice, "Surface Waves: What Are They? Why Are They Interesting?", Roke Manor Research Ltd. 2009, pp. 1-10.

Nov. 3, 2016 Search Report issued in Great Britain Patent Application No. GB1607672.1.

* cited by examiner

SIGNAL TRANSMITTING COMPONENT

The present disclosure concerns a signal transmitting component and a signal transmission system.

GB2522344 discloses a structural component formed of two layers. A first layer is a dielectric composite material and the second layer is a conductive material in contact with the first layer. The composite material is formed of reinforcement elements disposed in a matrix. A skin region has a greater proportion of matrix to reinforcement elements than in a bulk region of the material. The skin region is adjacent to the conductive material. The composite material is also configured to have an electrical reactance which propagates electromagnetic surface waves across it. First and second transducers are provided on or adjacent to the first layer to respectively transmit and receive electromagnetic surface waves to carry data and/or power across the first layer.

Surface waves are efficient to transmit data and or power across a surface because they propagate along and are trapped at the interface between media with differing properties, for example the interface between two materials or between one material and air. As a consequence there is little radiation of surface waves and any radiation which does occur attenuates exponentially away from the surface. Thus surface waves are a relatively secure form of wireless data transmission.

One disadvantage of GB2522344 is that only a limited number of signals can be transmitted at once. This is because each signal must be transmitted at a different frequency in order to be unique. Furthermore, only some frequencies resonate, and therefore transmit, for any given dielectric constant of the composite material.

The signals can alternatively be prefaced with a unique identifier code to identify the transmitter from which it was sent and/or the receiver to which it is directed. However, this may reduce the bandwidth available for useful signal to be transmitted. Each receiver must also be capable of reading at least the identifier codes of every signal in order to determine if the signal is intended for that receiver which means the receivers may need to be oversized and/or include extra processing capacity.

According to a first aspect of the present invention there is provided a component comprising:
 a substrate;
 a dielectric coating on the substrate, the electrical reactance of the dielectric coating configured for the propagation of electromagnetic surface waves;
 wherein the dielectric coating is arranged as a plurality of discrete pathways.

Advantageously the component is suitable for transmitting a plurality of signals as electromagnetic surface waves without interference between the signals. Advantageously the component is suitable for the propagation of trapped surface waves such as Zenneck waves. Advantageously such surface waves provide a relatively secure form of wireless data transmission since they decay rapidly away from the surface. Furthermore the signals have to be transmitted at a narrow range of angles in order to propagate along the surface so it is unlikely that external signals can be arranged to disrupt, jam or corrupt the transmitted signals. Advantageously more than one copy of the signal can be transmitted along different pathways to provide redundancy. The plurality of pathways may comprise two pathways or more than two pathways.

The plurality of discrete pathways may be arranged as a space-filling curve. The pathways may form a discontinuous space-filling curve. The discontinuities advantageously coincide with sensors, transmitters and receivers for the signals transmitted as surface waves at the interface of the dielectric coating with the substrate or with the air or other fluid adjacent to its other side.

The space-filling curve may be a Hilbert curve; a Peano curve; a fractal curve; a node-replacement curve; or an edge-replacement curve. The space-filling curve may alternatively be a non-regular curve which intersects every node of a regular grid exactly once. The regular grid is based on tessellating regular polygons; that is polygons in which all the internal angles at the vertices are the same and all the edges are the same length. The regular grid may therefore be based on squares or triangles. Advantageously by arranging the pathways as space-filling curves the surface of the substrate can be densely covered by dielectric coating without any overlapping or intersection.

At least one of the pathways may have a first dielectric constant. Thus the dielectric coating forming the at least one pathway has the first dielectric constant. At least one other of the pathways may have a second dielectric constant which is different from the first dielectric constant. Thus the dielectric coating forming the at least one other pathway may have the second the dielectric constant. One or more further pathways may be formed from dielectric coating with a third dielectric coating and so on. Typically surface waves can 'jump' small gaps in the surface in which they are trapped. Advantageously by providing pathways with different dielectric coatings the discrete pathways can be arranged close together because the signals will not be able to jump to a different pathway.

The substrate may comprise a composite material. The substrate may comprise a fibre-reinforced composite material. The fibres may comprise any of carbon fibres; glass fibres; aramid fibres; and/or para-aramid fibres. The fibres may be chopped, woven or aligned. The composite material may be formed from pre-pregged fibres or formed by dry fibre layers and infiltrated with resin. The dielectric coating may be applied as a further layer during formation of the composite material substrate. Alternatively it may be applied afterwards, for example by physical or chemical vapour deposition. Advantageously complex shapes can be formed using composite materials and used to transmit electromagnetic surface waves. Advantageously the health of the composite material substrate may be monitored using signals passed through the dielectric coating pathways.

There may be a layer to sandwich the dielectric coating between the substrate and the layer. The layer may be configured to form a barrier or shield. The layer may form a physical barrier or shield to protect the pathways from physical damage. The layer may additionally or alternatively form an electromagnetic barrier or shield. For example, the layer may be configured to form a Faraday cage. Advantageously this further secures the transmitted signals from electromagnetic interference.

The layer may comprise the same material as the substrate. For example it may be a composite material, with or without fibre-reinforcement. The layer may be an electromagnetically opaque material to prevent radiated electromagnetic waves from escaping or external electromagnetic waves reaching the dielectric coating that forms the pathways. The layer may alternatively be a wholly or partially electromagnetically transparent material. The layer may be a low impedance material compared to the dielectric coating. Alternatively it may be a high impedance material compared to the dielectric coating.

The component may be all or part of any one of the following non-exclusive list: an electrical panel; an electrical raft; a gas turbine engine component; a fan case; a gas turbine engine nacelle; a gas turbine engine casing; an aircraft wing; an aircraft body; a propulsion system; a thruster; a marine vessel hull; a marine vessel bulkhead; a land vehicle body; a rail or traction engine component; a diesel engine component; a power plant component.

The present invention also provides a gas turbine engine comprising a component as described; a diesel engine comprising a component as described; an aircraft comprising a component as described; a marine vessel comprising a component as described; a land vehicle comprising a component as described; a rail or traction engine comprising a component as described; a power plant comprising a component as described. The power plant may comprise a gas turbine engine or a diesel engine. The vehicle may comprise an aircraft, a marine vessel, a land vehicle, a rail engine, or a traction engine.

According to a second aspect of the present invention there is provided a signal transmission system comprising:
 a component as described;
 an electromagnetic wave transmitter coupled to the substrate; and
 an electromagnetic wave receiver coupled to the substrate.

The transmitter and the receiver may each be directly physically coupled to the substrate or may be indirectly coupled, for example via spacers.

The electromagnetic wave transmitter may be further configured to function as an electromagnetic wave receiver. The electromagnetic wave receiver may be further configured to function as an electromagnetic wave transmitter. The system may comprise a plurality, at least two, of electromagnetic wave transmitters. The system may additionally or alternatively comprise a plurality, at least two, of electromagnetic wave receivers. There may be at least one electromagnetic wave source electrically coupled to the or each electromagnetic wave transmitter. The source may be a sensor or transducer. The source may provide temperature, pressure, acceleration, force, direction or other measurements to be transmitted across the component.

The present invention also provides a gas turbine engine comprising a signal transmission system as described; a diesel engine comprising a signal transmission system as described; a propulsion system comprising a signal transmission system as described; a vehicle comprising a signal transmission system as described; an aircraft comprising a signal transmission system as described; a marine vessel comprising a signal transmission system as described; a land vehicle comprising a signal transmission system as described; a rail or traction engine comprising a signal transmission system as described; a power plant comprising a signal transmission system as described. The power plant may comprise a gas turbine engine or a diesel engine. The vehicle may comprise an aircraft, a marine vessel, a land vehicle, a rail engine, or a traction engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Figure 2:
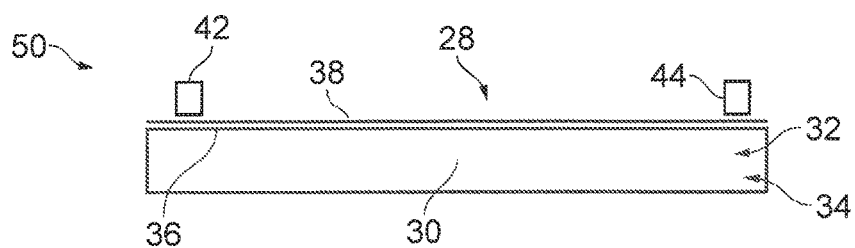
Figure 3:
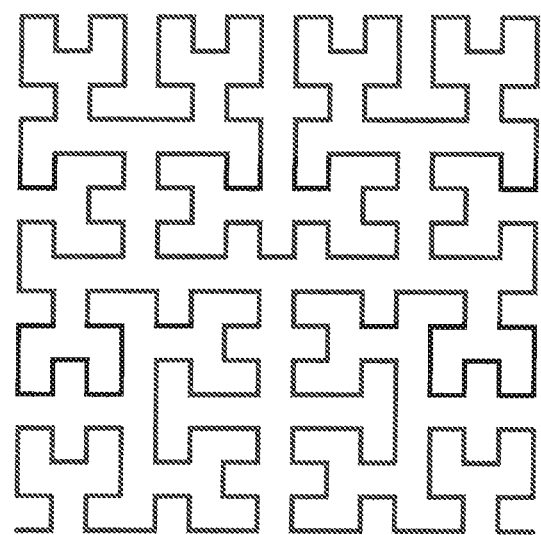
Figure 4:
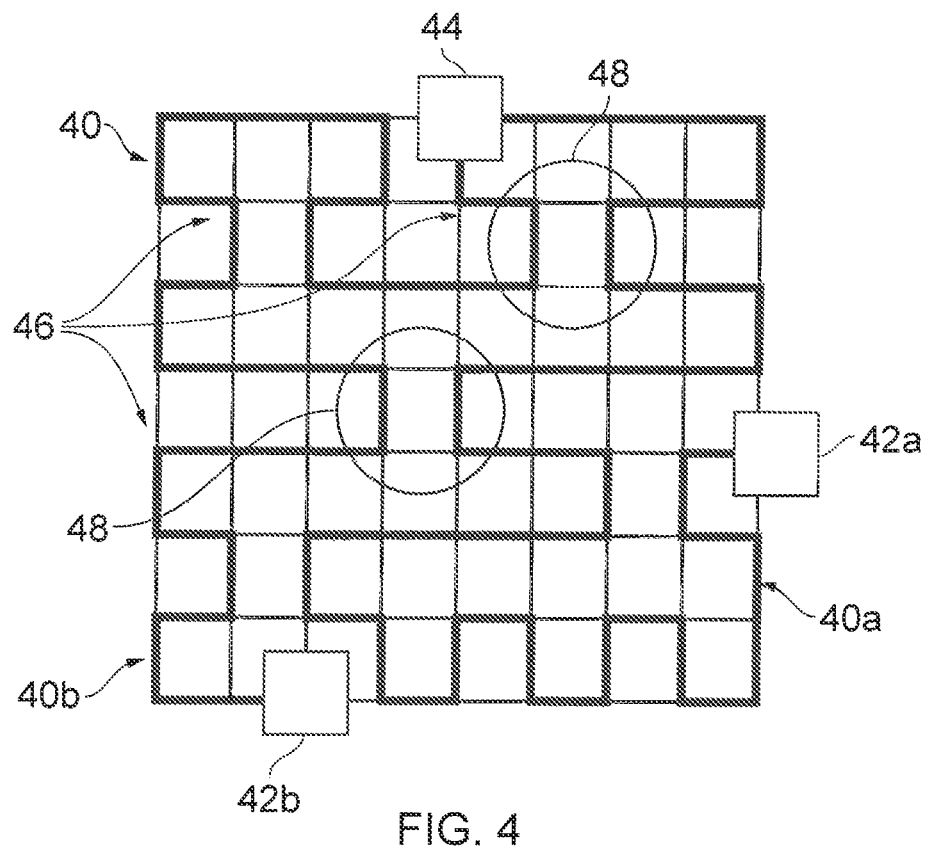
Figure 5:
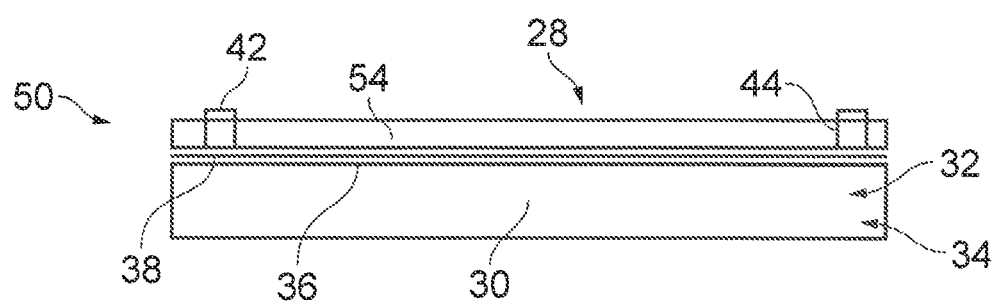

Embodiments will now be described by way of example only, with reference to the Figures, in which:
 FIG. 1 is a sectional side view of a gas turbine engine;
 FIG. 2 is a schematic exploded side view of a component;
 FIG. 3 is a continuous Hilbert curve;
 FIG. 4 is an exemplary pair of space-filling curves;
 FIG. 5 is a schematic exploded side view of another component.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A component 28 is shown in FIG. 2 in exploded view. The component 28 includes a substrate 30. The substrate 30 may be, for example, a composite material formed from an organic matrix. The composite material may be formed in layers of resin (the matrix) which are cured to become rigid. Such rigid composite layers may be particularly stiff and/or lightweight. Fibres may be included within the resin matrix, in the form of chopped, aligned and/or woven fibres, to reinforce the composite material. Any suitable resin may be used such as epoxy, BMI (bismaleimide), PEEK (polyetheretherketone), PTFE (polytetraflouroethylene), PAEK (polyaryletherketone), polyurethane, and/or polyamides (such as nylon). Any suitable fibres may be used, for example carbon fibres, glass fibres, aramid fibres, and/or para-aramid fibres.

The composite material substrate 30 may be formed of organic matrix composite layers with different compositions of matrix (or resin) and fibres. For example, a bulk layer 32 of the substrate 30 may include resin and fibres whereas a skin layer 34 may comprise only resin, or a smaller proportion of fibres than in the bulk layer 32. The bulk layer 32 and the skin layer 34 may not have the same thickness. For example the bulk layer 32 may be thicker than the skin layer 34. The skin layer 34 may be arranged to abut a conductor (not shown) or another component. It may therefore be beneficial for the skin layer 34 to exhibit a smooth surface which can more easily be achieved with resin than fibres.

The composite layers may take any suitable form and/or construction. For example, the composite layers may each comprise one or more ply layers (or plies) of resin and fibres. Such a fibre and resin compound may, after suitable treatment (for example curing, such as heat treatment), produce the rigid composite material. The fibres in one ply layer may extend in a different direction to those of another ply layer. For example fibres in one ply layer may extend perpendicularly or at 30 degrees, 45 degrees or 60 degrees to fibres in another ply layer. The fibres may be pre-impregnated (or "pre-pregged") with the resin.

Prior to any treatment, such as curing, the composite layers may be flexible, for example supple, pliable or malleable. As such, when the layers are placed together, they may be moulded, or formed, into any desired shape. For example, the layers may be placed into a mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final substrate 30 to adopt shapes that are curved in two-dimensions or three-dimensions. The shape of the tool or mould may be the desired shape of the final substrate 30, or a shape that results in the desired shape of the final substrate 30 after allowing for some shrinkage during curing.

Any suitable method could be used to produce the composite material substrate 30. For example, the strands/fibres of the organic matrix composite layers need not be pre-impregnated with the resin. Instead, the fibres/strands could be put into position in a dry state, and then the resin could be fed (or pumped) into the mould. Such a process may be referred to as a resin transfer method.

The method of manufacturing a composite material substrate 30 from the layered structure comprises curing. The curing could be a single-stage cure, in which all of the layers in the layered structure are cured once at the same time. Alternatively, the curing could be a multi-stage cure, in which at least two of the layers are cured, before additional layers are added and then the layered structure is cured again.

A surface 36 of the component 28 also includes a dielectric coating 38. The dielectric coating 38 is configured to have an electrical reactance that is conducive to the propagation of electromagnetic surface waves. In particular, the dielectric coating 38 may be arranged to guide trapped surface waves such as Zenneck surface waves. The dielectric coating 38 has a different dielectric constant to that of the substrate 30.

US2013/0064311 teaches that the surface reactance of the surface or interface along which the surface waves are to propagate is preferably between 50 and 1000Ω (ohms). This range is suitable for propagation of electromagnetic surface waves. However, surface reactances outside this range may also be suitable for surface wave propagation in some applications.

More specifically, the dielectric coating 38 is arranged as at least two discrete, convoluted pathways 40 across the surface 36 of the component 28. Each of the pathways 40 is discrete in the sense that it does not intersect with, join, or cross itself or any other pathway 40. The plurality of pathways 40 (at least two) are arranged so that sections of two or more pathways 40 are parallel for parts of their lengths but other sections of the pathways 40 may diverge from each other.

A signal transmission system 50 includes the component 28 as described. It also includes an electromagnetic wave transmitter 42 and an electromagnetic wave receiver 44 each coupled to the substrate 30. The transmitter 42 and the receiver 44 may be physically mounted to the substrate 30. Alternatively the transmitter 42 and/or the receiver 44 may be spaced from the substrate 30 by a small distance, for example up to 5 mm or up to 10 mm in some applications, which is close enough for electromagnetic coupling. The transmitter 42 is coupled to or integrally formed with an electromagnetic wave source such as a sensor. The receiver 44 is coupled to or integrally formed with an electromagnetic wave processor which is capable of processing the electromagnetic wave into a different format, for example to determine the absolute or relative value of a sensor measurement. In the signal transmission system 50 each pathway 40 is arranged to extend between a transmitter 42 and a receiver 44, where 'transmitter' and 'receiver' refer to the function of the device. As is common in signal transmission, the transmitter 42 may be a transceiver configured to transmit, receive, or transmit and receive electromagnetic signals. Similarly, the receiver 44 may be a transceiver configured to receive, transmit, or receive and transmit electromagnetic signals. Thus communication may be one-directional: from transmitter 42 to receiver 44. Alternatively, communication may be two-directional where each of the transmitter 42 and receiver 44 are configured to transmit and receive electromagnetic signals. In this manner a signal may be transmitted along one pathway 40 and received at a receiver 44 then re-transmitted along a different pathway 40 of dielectric coating 38 to a further receiver 44. A network of transmitters 42, receivers 44 and transceivers (which have the function of both a transmitter and a receiver) may be created on the component 28 linked by pathways 40 of dielectric coating 38 on the surface 36 of the component 28.

The signal transmission system 50 may include more than one electromagnetic wave transmitter 42. Alternatively or additionally the signal transmission system 50 may include more than one electromagnetic wave receiver 44. Any one or more of the transmitters 42 may also function as a receiver 44. Similarly any one or more of the receivers 44 may also function as a transmitter 42.

The receiver 44 or each receiver 44 may be coupled to or form a part of a system monitoring unit, for example an engine monitoring unit. The transmitter 42 or transmitters 42 may each be coupled to or integral with one or more sensors such as pressure, temperature or acceleration transducers. Thus the signals transmitted by each transmitter 42 may be pressure, temperature, acceleration or other parameters of the component 28. The signals may also be measured on or derived from measurements on other components of a larger system and then transmitted across the component 28 using the signal transmission system 50.

More than one pathway 40 may be connected to a single transmitter 42 and/or more than one pathway 40 may be connected to a single receiver 44. Where two or more pathways 40 each extend between the same transmitter 42 and receiver 44 they provide redundancy. If the pathways 40 are routed differently across the surface 36 of the component 28 the probability that both or all the pathways 40 between specific transmitters 42 and receivers 44 are damaged or broken simultaneously is reduced. Thus the probability that the signals are transmitted is higher than if only one pathway 40 is provided between each pair of transmitter 42 and receiver 44.

Two or more pathways 40 each coupled between the same transmitter 42 and receiver 44 may advantageously be arranged to have different path lengths across the surface 36 of the component 28. If a timing signal is provided to the receiver 44 by transmission along each pathway 40 it is possible to identify the difference in the length of time taken to receive a signal transmitted from the transmitter 42 at the receiver 44. By monitoring changes in the respective lengths of time taken for signals to travel along the pathways 40 it is possible to deduce flexion of the substrate 30, for example caused by vibration stresses or strains applied to or arising within the component 28. Where the substrate 30 flexes so that the surface 36 is slightly convex or slightly concave the dielectric coating 38 forming the pathways 40 will generally thin slightly. This increases the electrical impedance which thus changes the frequencies which propagate along the pathways 40. The frequencies in the received signals can be compared to frequency distributions for signals generated through known component distortions. Thus a particular pattern of frequencies can indicate thinning of the dielectric coating 38 in particular regions of the component 28 which may be related to particular modes of vibration or flexing.

In some cases the frequency of changes in the frequencies received will indicate the underlying cause, for example where the oscillating frequency coincides with a vibration mode. In other cases this will not be sufficient to determine the underlying cause. Differences in the frequency distribution can then be compared with other measurements, for example from thermocouples and/or accelerometers, in order to deduce the underlying cause of the observed changes. For example, the underlying cause may be heating of the component 28, which will be apparent from temperature measurements made by one or more thermocouple. Alternatively the underlying cause of the observed changes may be caused by pressure waves across or through the component 28, which can be identified by accelerometer measurements.

A health monitoring signal may be transmitted as a surface wave across the component 28. The health monitoring signal may comprise a "chirrup" of multiple known frequencies. The received signal can then be compared to the transmitted signal. Where the pathways 40 and the substrate 30 are healthy, that is there are no breaks or gaps and no thinning of the dielectric coating 38, the received signal will be identical to or at least closely match the transmitted signal. However, where there are gaps or other damage in the dielectric coating 38 forming the pathway or pathways 40 along which the health signal is transmitted, the received signal will differ from the transmitted signal. For example, one or more of the frequencies in the signal may be attenuated so that it is weak or later arriving at the receiver 44 than other frequencies. One or more of the frequencies may be unable to bridge a gap in a pathway 40 whereas one or more others of the frequencies in the transmitted signal may be able to jump the same gap. By analysing the frequency components of the received signal information about the degradation of the component 28 can be deduced.

The health monitoring signal may be transmitted at recurring intervals. For example, it may be transmitted once each time the component 28 is used or may be transmitted more or less frequently. The health monitoring signal may be transmitted at a regular time interval, for example once or several times each hour, once or several times each minute, once or several times each second. The health monitoring signal may be transmitted when triggered by an event. For example transmission of the health monitoring signal may be triggered by a gap or pause in transmission of other signals across the component 28. By comparing the received signal over time any deterioration of the component 28 can be identified and tracked. Advantageously maintenance or repair of the component 28 can be scheduled where appropriate.

The discrete pathways 40 may be arranged as space-filling curves. For example, they may be arranged as a Hilbert curve, a Peano curve or another fractal curve. The space-filling curve may be formed by an iterative method that is based on edge-replacement or node-replacement. A space-filling curve may be defined as a one-dimensional curve (line) that intersects exactly once with every node 46 of a regular grid in a higher dimensional plane. The curve may be fractal (self-repeating on every scale) or irregular. A regular grid is one that is formed of tessellating regular polygons or polyhedrons. The nodes 46 may be vertices or centres of the polygons or polyhedrons.

Regular polygons are closed planar shapes that have every side (edge) equal and the angle at every vertex equal, for example a square or equilateral triangle. A regular polygon therefore has rotational symmetry about its centre. Regular polyhedrons are closed three-dimensional objects that have every side (edge) equal, the angle at every vertex equal and every face identically shaped, for example a cube. Polyhedrons have a centre on each face, which is the point about which each face is rotationally symmetrical, and a centre about which the whole object is rotationally symmetrical.

A Hilbert curve is an example of a space-filling curve which is generated from a U-shaped generator on a square grid. A Hilbert curve is shown in FIG. 3. It can be seen that the Hilbert curve intersects every node 46 in a square grid which covers a square area (that is a two-dimensional space). The definition of the space-filling curve can be modified to enable the corners to be radiused or curved. In this case the curve may not truly intersect every node 46 but will be closer to a given node 46 than to any other node 46. The constraint on proximity to nodes 46 will define the angularity of the corners in the curve.

Since the pathways 40 are discrete they form a discontinuous space-filling curve. Thus the set of pathways 40 intersect every node 46 of a regular grid exactly once but each individual pathway 40 does not intersect every node 46. Two pathways 40 may intersect the same node 46 only where a transmitter 42 or receiver 44 is located at that node 46. The space to be filled by the pathways 40 may be the entire surface 36 of the component 28. Alternatively it may be a part of the surface 36. Alternatively the pathways 40 may fill part or all of the surface 36 and part or all of one or more other surfaces of the component 28. The surface 36 need not be flat (planar) but may be curved in one or more directions.

The advantage of arranging the pathways 40 of dielectric coating 38 as a space-filling curve is that the dielectric coating 38 covers the whole of the defined space (area or volume) so signals can be transmitted from anywhere on the surface 36. However, because the pathways 40 are discrete it is not necessary to transmit multiple signals using a finite number of different frequencies in order to distinguish between the signals. Instead, each signal can be transmitted along its own pathway 40 or pathways 40.

Furthermore, by arranging the dielectric coating 38 as a plurality of discrete pathways 40 arranged as a discontinuous space-filling curve it is possible to identify the position of any damage to the component 28. This is because damage to the component 28 will result in one or more pathways 40 being broken so that the signals cannot cross the break and are therefore not received by the coupled receiver 44. In the arrangement of GB2522344 it is possible to ascertain that there is a break because the signal would take a different route across the surface of the component and therefore take longer to arrive at the receiver than expected. Advantageously in the present arrangement it is possible to determine not only that there is damage, because one or more signals will not arrive at their respective receivers 44, but also where the damage has occurred. This is because if a single pathway 40 is broken the damage location must be somewhere along that pathway 40. If two or more pathways 40 are broken the location of damage can be identified more precisely because there will only be limited locations where those particular pathways 40 are close together. Note that if a small break occurs, for example of up to 5 mm or even up to 10 mm, the signals may be able to jump the gap. Nonetheless, the electrical resistance of the broken pathway 40 will have increased and therefore be discernible.

An exemplary arrangement of pathways 40 are shown in FIG. 4 on an exemplary square grid of nodes 46. A first transmitter 42a and a second transmitter 42b are each provided to transmit signals. Each transmitter 42a, 42b may be coupled to a sensor or other signal generator. A receiver 44 is also provided at a location which is physically separated from each of the first and second transmitters 42a, 42b. A first pathway 40a extends on a convoluted path from the first transmitter 42a to the receiver 44. A second pathway 40b extends on a convoluted path from the second transmitter 42b to the receiver 44. The first and second pathways 40a, 40b are different lengths as drawn. In other arrangements the pathways 40 could be the same length. Some sections of the first pathway 40a run parallel to sections of the second pathway 40b. Two such parallel sections are shown by rings 48. Then the pathways 40a, 40b diverge and may converge again to run parallel. The sections of each pathway 40a, 40b between sections that are parallel may be different lengths.

An alternative signal transmission system 50 is shown in FIG. 5. It shows a component 28 which is the same as that shown in and described with respect to FIG. 2. The component 28 has the first surface 36 and a second surface 52 spaced therefrom. As illustrated the second surface 52 is at a constant distance from the first surface 36, vertically as drawn, but in other embodiments the first and second surfaces 36, 52 need not be equally spaced. Edges of the first and second surfaces 36, 52 may meet along some or all of their length to form a vesica piscis (formed by the intersection of two discs or spheres of equal radius), a non-symmetrical lens, a D-shape or a more complex shape. Each of these shapes may be a cross-section or the three-dimensional equivalent shape.

The component 28 also includes a layer 54. The layer 54 is arranged to sandwich the dielectric coating 38 between the layer 54 and the substrate 30. The layer 54 may have any one or more of a number of purposes. Firstly, the layer 54 may function as a physical barrier or shield to protect the dielectric coating 38 from damage.

Secondly, the layer 54 may be arranged to seal the dielectric coating 38 from contaminants such as fluids or particulates. For example, where the component 28 is part of a marine vessel it may be exposed to water which may affect performance of the dielectric coating 38 or may cause 'shorting' paths for the surface waves between different pathways 40 or sections of individual pathways 40. The component 28 may also be exposed to or immersed in other fluids such as oil, for example in gear box components, or fuel. Where the component 28 is exposed to or immersed in a fluid, liquid or gas, it may also be exposed to particulates carried by the fluid which may cause 'shorting' paths or damage to the pathways 40 of dielectric coating 38.

Thirdly, the layer 54 may function as an electromagnetic shield. For example the layer 54 may be configured to form a Faraday cage. For example, the layer 54 may be in the form of a regular metallic mesh. Where the component 28 is part of an aircraft or an engine powering an aircraft, in particular, it may be beneficial for the layer 54 to form a Faraday cage to prevent damage from lightning strikes or other electromagnetic discharges. Electromagnetic surface waves carry a low risk of interference from external sources because there is a very precise angle of incidence required to cause propagation. By configuring the layer 54 to function as a Faraday cage the transmitted surface waves are further protected from interference from sources external to the component 28. The layer 54 may also function to reflect any radiated signal back towards the surface 36. Alternatively the layer 54 may be positioned sufficiently far from the dielectric coating 38 that any radiated signal has attenuated to negligible level before reaching the layer.

The layer 54 may be formed of the same material as the substrate 30, for example a composite material formed of a resin matrix with or without fibre reinforcement. Where the layer 54 is formed of the same material as the substrate 30, sandwiching the dielectric coating 38 between the layer 54 and the substrate 30 has the effect of embedding the dielectric coating 38 within the component 28. Alternatively the layer 54 may comprise a different material. The layer 54 may be electromagnetically opaque to block electromagnetic waves from penetrating through the layer 54 to the dielectric coating 38. Alternatively the layer 54 may be partially or wholly transparent to electromagnetic waves. The layer 54 may be a low impedance material, relative to the dielectric coating 38 and/or the substrate 30, or may be a high impedance material.

The transmitter or transmitters 42 and the receiver or receivers 44 may be embedded within the layer 54 as shown in FIG. 5. Alternatively they may be coupled to the surface of the layer 54 that is distal to the dielectric coating 38. Alternatively where the layer 54 is spaced from the dielectric coating 38 the transmitter or transmitters 42 and the receiver or receivers 44 may be mounted within the gap between the dielectric coating 38 and the layer 54. Different ones of the transmitter 42, transmitters 42, receiver 44 and receivers 44 may be mounted differently with respect to the layer 54.

Although the substrate 30 has been described as comprising a composite material it may be formed of different materials. For example the substrate 30 may be metallic or ceramic. It may be formed of an alloy.

Although a cuboid component 28 has been illustrated and described the invention is not so limited. The dielectric coating 38 can be applied to any shape or size of component 28. The surface 36 of the component 28 to which the dielectric coating 38 is applied does not need to be flat or smooth. Thus complex component 28 with non-planar, undulating, convex, concave or otherwise complex surfaces 36 are suitable for the application of dielectric coating 38 in discrete pathways 40 for the propagation of electromagnetic surface waves across the component 28.

The component 28 may be a stationary component, either in absolute terms or relative to other components 28 in an assembly or system. Alternatively the component 28 may be a moving component 28, for example rotating or translating. Where the component 28 rotates it may be necessary to transmit the signal from the receiver or receivers 44 on the rotating component 28 to a processor or another component that does not rotate or rotates at a different speed or in a different direction to the component 28. Standard signal transmission techniques for passing signals across rotating-rotating or rotating-static interfaces can be used, including wireless transmission and slip rings. For translating or oscillating components 28 the same applies, mutatis mutandis.

Alternatively where the gap across the rotating-rotating or rotating-static interface is small the receiver or receivers 44 may be located on the other side of the interface to the component 28. The surface waves trapped by the dielectric coating 38 will traverse the gap and thus be received by the receiver 44. Optionally there may be a further section of the pathway 40 on the second side of the interface.

The component 28 may form part of a gas turbine engine 10. Some exemplary gas turbine engine components 28 include a containment casing such as the fan case 24; a nacelle 21; a rear casing; a drive shaft, for example to extract power from a shaft of the gas turbine engine 10 and deliver it to an accessory gearbox or directly to accessories such as a fuel or oil pump; an electrical panel or raft mounted to the outside of the gas turbine engine 10, its casing or nacelle 21 and having embedded wiring and/or pipes for transferring signals and/or fluids around the engine 10; a fan blade, a compressor blade, a turbine blade; a disc, a blink (a bladed disc) or a rotor hub.

The component 28 may form part of an aircraft. For example the component 28 may be an aircraft wing or fuselage panel. Wings and fuselages may be formed of composite materials which are generally lighter than metals or alloys.

The component 28 may form part of a marine vessel. For example the component 28 may be a hull; a bulkhead; or part of the internal structure of a ship or submarine such as cabin walls, floors and ceilings. The component 28 may form part of a propulsion system for a marine vessel. For example the component 28 may be part of a thruster or a propeller.

The component 28 may form part of a land vehicle, a rail vehicle or a traction vehicle. The component 28 may form part of an engine for such a vehicle. A land vehicle, rail or traction engine may run on gas, diesel or be a hybrid engine able to switch to use different fuels.

The component 28 may form part of a power plant. For example the component 28 may be part of a nuclear or petro-chemical power plant. The component 28 may alternatively form part of a wind turbine or tidal turbine.

A gas turbine engine 10 may include a signal transmission system 50 as described. An aircraft; a marine vessel; a land vehicle; a rail vehicle; a traction vehicle; a diesel engine; a traction engine; and a power plant may each include a signal transmission system 50.

The component 28 may be in an assembly or test environment. A signal transmission system 50 may be set up to include the component 28 in order to monitor the strain applied to or existing in the component 28. Such strain may be caused by manufacturing or assembly processes, for example where a component 28 is slightly out of shape relative to designs. Strains may be generated in the component 28 during testing. The strain may also result from distortion caused by relaxation of a component 28 following test running or during storage. Advantageously large components 28 and inaccessible parts of components 28 can be easily monitored by providing a network of discrete pathways 40 of dielectric coating 38 on the surface 36 of the component 28. Advantageously multiple sensors can be attached to the component 28 in order to monitor it without needing a complementary harness of wiring which may be both heavy and difficult to connect to the sensors.

The signal transmission system 50 may be used in real-time to monitor torque, force or pressure applied to the component 28 during testing. It can also be used to identify and therefore to correct distortions or strains from manufacturing and/or assembly. Advantageously damage and weakness in the components 28 can be reduced by including the signal transmission system 50 in a feedback loop during manufacture and/or assembly. Pre-existing damage and weakness can also be identified and remedied during testing of the component 28 or an assembly including the component 28.

The component 28 may be passively monitored using the signal transmission system 50 to transmit signals received from various sensors and transducers to a monitoring system. The signal transmission system 50 can also be used for active control of the component 28 and/or adjacent components and systems. For example, the component 28 may be or may be coupled to an actuator. The signal transmission system 50 can be used to transmit control signals from a controller, for example an engine electronic controller of a gas turbine engine 10, to the actuator. Feedback from the actuator may be transmitted to the controller along the pathways 40 of the component 28 in order to confirm whether the actuator has moved as instructed, thereby providing closed loop control through the signal transmission system 50.

The pathways 40 have been described as following convoluted paths on the surface 36 of the substrate 30. In some arrangements the dielectric coating 38 can be arranged to include depth as well as length and breadth so that the pathways 40 extend within a volume not just an area. Thus there is some stacking of pathways 40. Optionally the pathways 40 may form discontinuous space-filling curves in the volume. Thus the set of pathways 40 intersects every node 46 of the volume exactly once without any pathways 40 joining, meeting or crossing itself or any other pathway 40 in the depth direction.

In some other arrangements where the dielectric coating 38 extends within a volume the dielectric coating 38 can be configured such that one of the pathways 40 can cross itself or another of the pathways 40, with an electrical insulator between. Thus the pathways 40 do not intersect on any axis of the grid but a view through the grid from one direction (e.g. the X-Y plane where the grid is aligned with Cartesian coordinates) will exhibit some overlaps. The set of pathways 40 may be discontinuous space-filling curves which intersect every node 46 of the volume exactly once without any pathways 40 joining or meeting another pathway 40. Each pathway 40 may run parallel to or cross sections of the same pathway 40 or another pathway 40 at a minimum spacing of one grid unit in any direction.

One or more of the pathways 40 may be formed from dielectric coating 38 having a first dielectric constant. One or more of the pathways 40 may be formed from dielectric coating 38 have a second, different dielectric constant. Advantageously this further reduces the potential for interference between signals transmitted on different pathways 40. Similarly, one or more of the pathways 40 may have a third dielectric constant and so on.

The dielectric coating 38 may be applied by thin film deposition. For example the dielectric coating 38 may be applied by physical vapour deposition or chemical vapour deposition. The pathways 40 may be deposited by the deposition head tracking along the routes. Alternatively the surface 36 may be masked and the dielectric coating 38 be more generally applied across the surface 36. The masking can then be removed to leave the pathways 40 of dielectric coating 38 with uncoated portions of surface 36 in between.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A component comprising:
   a substrate;
   a dielectric coating on the substrate, the electrical reactance of the dielectric coating configured for the propagation of electromagnetic surface waves;
   wherein the dielectric coating is arranged as a plurality of discrete pathways; and
   wherein at least one of the pathways has a first dielectric constant and at least one other of the pathways has a second dielectric constant which is different from the first dielectric constant.

2. A component as claimed in claim 1 wherein the plurality of discrete pathways is arranged as a space-filling curve.

3. A component as claimed in claim 2 wherein the space-filling curve is a Hilbert curve; a Peano curve; a fractal curve; a node-replacement curve; an edge-replacement curve.

4. A component comprising:
   a substrate;
   a dielectric coating on the substrate, the electrical reactance of the dielectric coating configured for the propagation of electromagnetic surface waves;
   wherein the dielectric coating is arranged as a plurality of discrete pathways; and
   wherein the substrate comprises a composite material.

5. A component as claimed in claim 4 wherein the substrate comprises a fibre-reinforced composite material.

6. A component as claimed in claim 1 further comprising a layer to sandwich the dielectric coating between the substrate and the layer.

7. A component as claimed in claim 6 wherein the layer is configured to form a Faraday cage; a barrier or shield.

8. A component as claimed in claim 6 wherein the layer comprises the same material as the substrate; an electromagnetically opaque material; an electromagnetically transparent material; a low impedance material; a high impedance material.

9. A component as claimed in claim 1 comprising any one or part of: an electrical panel; an electrical raft; a gas turbine engine component; a fan case; a gas turbine engine nacelle; a gas turbine engine casing; an aircraft wing; an aircraft body; a propulsion system; a thruster; a marine vessel hull; a marine vessel bulkhead; a land vehicle body; a rail or traction engine component; a diesel engine component.

10. A power plant comprising a component as claimed in claim 1.

11. A propulsion system comprising a component as claimed in claim 1.

12. A vehicle comprising a component as claimed in claim 1.

13. A signal transmission system comprising:
    a component comprising:
       a substrate;
       a dielectric coating on the substrate, the electrical reactance of the dielectric coating configured for the propagation of electromagnetic surface waves;
       wherein the dielectric coating is arranged as a plurality of discrete pathways;
    an electromagnetic wave transmitter coupled to the substrate; and
    an electromagnetic wave receiver coupled to the substrate.

14. A signal transmission system as claimed in claim 13 wherein the electromagnetic wave transmitter is further configured to function as an electromagnetic wave receiver.

15. A signal transmission system as claimed in claim 13 wherein the electromagnetic wave receiver is further configured to function as an electromagnetic wave source.

16. A power plant comprising a signal transmission system as claimed in claim 13.

17. A propulsion system comprising a signal transmission system as claimed in claim 13.

18. A vehicle comprising a signal transmission system as claimed in claim 13.

* * * * *